Dec. 11, 1956  U. NISTRI  2,773,420
KINEMATIC SUPPORTS FOR PROJECTION OF PHOTOGRAMMETRICAL
PLOTTING APPARATUS
Filed Jan. 18, 1954
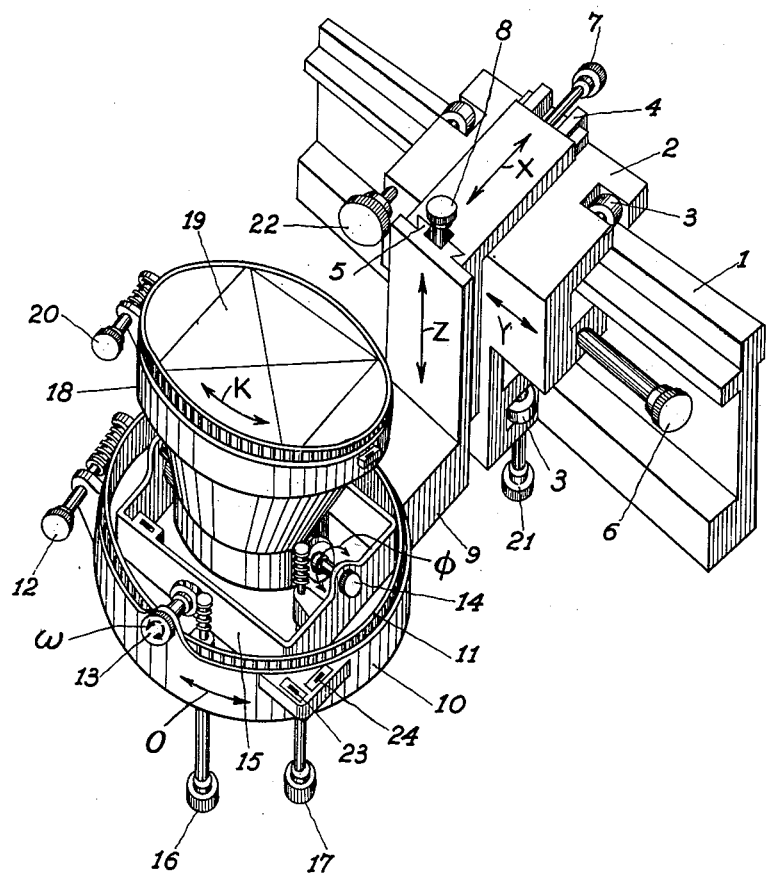
INVENTOR
UMBERTO NISTRI,
BY Bertram Ottinger
ATTORNEY

United States Patent Office 2,773,420
Patented Dec. 11, 1956

2,773,420

KINEMATIC SUPPORTS FOR PROJECTION CAMERAS OF PHOTOGRAMMETRICAL PLOTTING APPARATUS

Umberto Nistri, Rome, Italy

Application January 18, 1954, Serial No. 404,683

Claims priority, application Italy January 26, 1953

3 Claims. (Cl. 88—24)

Cameras of photogrammetric plotting apparatus are known to be assembled on special kinematic supports allowing the camera to re-acquire with respect to a system of three orthogonal axes—in which the horizontal plane has the axes X and Y whilst Z is the height—the original position it had with respect to the horizon in the moment when the photograph was taken.

Such supports allow the camera three degrees of freedom corresponding to six parameters of the outer orientation i. e. three linear displacements according to the three orthogonal axes X, Y, and Z (the co-ordinates of the camera station) and three angular rotations for the adjustment may be effected.

The three rotations consist generally in a rotation of the camera around its principal axis—the so called swing indicated by the letter K—and two rotations according to two orthogonal gimbal suspension axes, the primary of which is parallel to the X axis of the system and the secondary one parallel to the Y axis if the main axis of the camera has a vertical direction.

The rotation around the primary axis is indicated with the letter $\omega$ and the rotation around the secondary axis with the letter $\varphi$. When the outer orientation has been effected, both these angles are the projection of the angle of inclination on the planes YZ and XZ respectively.

Consequently, when varying the orientation of the camera with respect to the axes X and Y, i. e. when varying the intersection with the plane XY or the plane of orientation of the vertical plane containing the principal axis of the camera, the parameters $\omega$ and $\varphi$ have to be varied according to the new angle of orientation.

This necessity makes the operations for the orientation of each camera or of the optical models obtained much more difficult, whilst such operations could be avoided if there would be the possibility to incline the principal axis of the camera in the vertical plane containing the greatest inclination making it then rotate around the vertical or the nadir point axis, which passes through the centre of the objective of the camera.

In other words, such a support should allow not only the usual rotation of the camera (swing) around its principal axis, but also a rotation (orientation) around the vertical axis Z or the nadir point axis passing through the centre of the objective—which rotation will be indicated hereinafter by O—and a rotation around a straight line which is perpendicular with respect to both these axes (the principal axis of the camera and the nadir point axis), such line passing also through the centre of the objective, to be indicated by I (inclination or nadir distance). Such a support has been described in Serial No. 450,829 filed on February 1, 1949, now abandoned.

The arrangement of the camera remains thus unchanged by the changing of its orientation with respect to the axes X and Y of the plane of orientation so that the operations already made or the calculations for the new angles $\omega$ and $\varphi$ have not to be repeated.

Such a support does not offer the slightest difficulty for finding the outer orientation of the pair of cameras by means of systematic trials to annul the parallax of the height. This notwithstanding there is a feeling that there should be a support allowing always to vary the orientation of the camera with respect to the axes X and Y—as this is the case with the support above referred to—maintaining however the possibility to dispose of the rotations and according to the general use for some operations.

It is the purpose of this invention to create a support showing both features.

The single figure of the drawings illustrates an embodiment of the camera and supporting means.

In the single figure the reference numeral 1 denotes a support bridge which is common to all the cameras of a multiple plotting apparatus or of any other type of a plotting apparatus. On this bridge the supports for each camera are conveniently arranged thus allowing the linear displacements according to the orthogonal axes X, Y, and Z. By means of the bearings and the guides 3, the carriage 2 allows movements along the X axis, whilst the movements according to the axes Y and Z are possible by means of the guides and the respective slides 4 and 5.

All these movements are controlled in a known way by means of the buttons 6, 7 and 8.

The stirrup 9 contains the kinematic support for the adjustment or the orientation of the camera. This support comprises a cylindrical ring 10 in which another cylindrical ring 11 is coaxially arranged so that it may rotate around the axis passing through the centre of the both rings, which axis is perpendicular with respect to their plane.

In the ring 11 a gimbal suspension is arranged the primary axis of which supports the cradle 15, said axis being a perpendicular one and passes through the axis of rotation of the said ring. The secondary axis 14 of the gimbal suspension is supported by the cradle 15, and is perpendicular with respect to the principal axis of the camera.

Buttons 16 and 17 control the rotations of the axis of the camera around both gimbal suspension axes.

The secondary axis 14 carries a ring 18 in which the camera 19 is placed. The principal axis of the camera passes through the centre of the gimbal suspension, and it may rotate around its own axis by putting button 20 into action.

For the adjustment during construction the axis of rotation of the ring 11 is parallel to the guide 5 of the movement according to the axis Z.

When the bridge 1 is in a horizontal position and acting on the cams 21 and 22, controlling the bearings and the bubbles 23 and 24, guide 5 takes at the same time a vertical position according to the axis Z of the orthogonal axes system of the plotting apparatus, and also the axis of rotation for the orientation of the camera (nadir axis) becomes vertical.

On the contrary, when buttons 16 and 17 are moved by means of the bubbles placed on the camera, their main axis becomes vertical.

Both rotations are equivalent to each other only when the principal axis of the camera and the orientation or nadir axis coincide, but to each rotation of the camera around the gimbal suspension axes corresponds a neat differentiation of the two rotations, because one is the swing or the angle formed by the intersection of the vertical plane containing the principal axis of the camera with the photographic plane, and the internal orientation axes of the camera, whilst the other one is—as already said—the angle formed by the intersection of this orientation plane with the system of the orthogonal axes X and Y of the plotting apparatus.

When the primary gimbal suspension axes of each camera are turned according to the direction of the axis X of the plotting apparatus, this support creates the necessary conditions for the use of the decomposition of the angle of inclination according to the angles $\omega$ and $\varphi$.

When using only one of these angles, e. g. the primary axis, the inclination as foreseen may be imposed directly to the support described in the patent above referred to.

When the outer orientation is reached by means of any suitable operation, there is in both cases the possibility to vary the orientation of the cameras or, to say it better, of the images projected on the plane of orientation without changing the arrangement of the camera, in which case it is without any importance whether such arrangement is obtained using the rotations according to the parameters $\omega$ and $\varphi$, or directly turning the primary axis according to the maximum inclination.

What I claim is:

1. In a projector for photogrammetric apparatus having a support permitting linear displacement about three orthogonal axes, the combination of a first means carried by said support for permitting rotation about a fixed axis parallel to one of the orthogonal axes, a gimbal carried by the first means for permitting rotation about a primary axis and about a secondary axis perpendicular to and intersecting the primary axis, said primary and secondary axes intersecting on the axis of rotation of the first means, a second means carried by said gimbal for rotation therewith about both axes of the gimbal, a projection camera, and a third means carried by the second means for permitting rotation of the camera about an axis coincident with the optical axis of the camera, the axis of rotation of the third means intersecting the primary and secondary axes of the gimbal.

2. A combination as set forth in claim 1 wherein separate manually controllable means are provided for selectively adjusting the angular positions about the axes of rotation of the first and third means and about the primary and secondary axes of the gimbal.

3. A combination as set forth in claim 2 wherein the orthogonal axes are the X and Y axes in a horizontal plane and the vertical Z axis perpendicular thereto and wherein the fixed axis of rotation of the first means is parallel to the Z axis.

References Cited in the file of this patent

UNITED STATES PATENTS

| | | |
|---|---|---|
| 1,980,657 | Bauersfeld | Nov. 13, 1934 |
| 2,079,090 | Von Gruber | May 4, 1937 |
| 2,164,847 | Trautmann | July 4, 1939 |
| 2,200,594 | Diggins | May 14, 1940 |
| 2,263,341 | Kurtz | Nov. 18, 1941 |
| 2,309,752 | Cooke | Feb. 2, 1943 |
| 2,456,333 | Sharp et al. | Dec. 14, 1948 |